(12) United States Patent
Balasubramanian et al.

(10) Patent No.: US 7,944,992 B2
(45) Date of Patent: May 17, 2011

(54) MULTICARRIER CDMA SYSTEM

(75) Inventors: Srinivasan Balasubramanian, San Diego, CA (US); Patrick A. Hosein, San Diego, CA (US); Rath Vannithamby, Portland, OR (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1170 days.

(21) Appl. No.: 11/453,668

(22) Filed: Jun. 15, 2006

(65) Prior Publication Data
US 2007/0008934 A1    Jan. 11, 2007

Related U.S. Application Data

(60) Provisional application No. 60/691,367, filed on Jun. 17, 2005.

(51) Int. Cl.
*H04L 27/00* (2006.01)
(52) U.S. Cl. .................. 375/299; 375/347
(58) Field of Classification Search .......... 375/257, 375/299, 347; 370/208, 343
See application file for complete search history.

(56) References Cited

U.S. PATENT DOCUMENTS

| | | | | |
|---|---|---|---|---|
| 6,069,956 | A * | 5/2000 | Kurihara | 380/212 |
| 6,301,681 | B1 * | 10/2001 | Chen et al. | 714/751 |
| 6,961,326 | B1 * | 11/2005 | Chang et al. | 370/338 |
| 7,333,421 | B2 * | 2/2008 | Li | 370/208 |
| 2003/0026200 | A1 * | 2/2003 | Fu et al. | 370/208 |
| 2004/0116079 | A1 * | 6/2004 | Kim et al. | 455/103 |
| 2005/0174932 | A1 * | 8/2005 | Deng et al. | 370/208 |
| 2005/0259687 | A1 * | 11/2005 | Abrol et al. | 370/469 |
| 2005/0281243 | A1 * | 12/2005 | Horn et al. | 370/345 |
| 2006/0250941 | A1 * | 11/2006 | Onggosanusi et al. | 370/208 |
| 2009/0316307 | A1 * | 12/2009 | Olesen et al. | 360/267 |

FOREIGN PATENT DOCUMENTS

| | | |
|---|---|---|
| WO | WO 99/43133 | 8/1999 |
| WO | WO 01/20874 | 3/2001 |

OTHER PUBLICATIONS

Rashid Attar, Donna Ghosh, Chris Lott, Mingxi Fan, Peter Black, Ramin Rezaiifar, and Parag Agashe, "Evolution of cdma2000 Cellular Networks: Multicarrier EV-DO." *IEEE Communications Magazine*, Mar. 2006, pp. 46-53.

Oh et al., "The Bandwidth Efficiency Increasing Method of Multi-Carrier CDMA and Its Performance Evaluation in Comparison with DS-CDMA with Rake Receivers," Vehicular Technology Conference, May 16, 1999, pp. 561-565, XP010341935.

European Telecommunications Standards Institute, "Digital Cellular Telecommunications System (Phase 2+); High Speed Circuit Switched Data (HSCSD)—Stage 2 (GSM 03.34 version 7.0.0 Release 1998)," Aug. 1999, pp. 1-20, XP002227973.

* cited by examiner

*Primary Examiner* — Emmanuel Bayard
(74) *Attorney, Agent, or Firm* — Coats & Bennett, P.L.L.C.

(57) ABSTRACT

In a multicarrier CDMA system, a data stream is divided into two or more substreams and each substream is assigned to a different carrier. An RLP context is created for each carrier and the substreams are transmitted within a corresponding RLP context over a designated carrier. If a carrier is lost or dropped, the corresponding RLP context can persist after loss of the carrier and retransmitted packets tunneled to a different carrier.

28 Claims, 10 Drawing Sheets

MULTICARRIER CDMA SYSTEM

RELATED APPLICATION

This application claims priority under 35 U.S.C. §119(e) to U.S. provisional application Ser. No. 60/691,367, filed on Jun. 17, 2005, which is incorporated by reference.

BACKGROUND

The present invention relates generally to mobile communication systems, and, more particularly to multicarrier communication systems.

Conventional CDMA communication systems transmit data to users on a single carrier. To meet the demand for wireless high-speed data services, multicarrier CDMA systems will be required. Multicarrier CDMA systems, as the name implies, use multiple carriers to transmit data between a network station and a mobile station. Multicarrier CDMA offers advantages over conventional single carrier CDMA systems such as higher data rates, reduced latency, and improved support for Quality of Service (QoS). Multicarrier CDMA systems will also provide higher spectral efficiency by exploiting frequency selective fading across multiple carriers and through adaptive load balancing.

Existing proposals for multicarrier CDMA systems assume that all carriers employed use the same air interface. However, there may be circumstances where a communication system employs different air interfaces for different carriers. Therefore, there is a need for a multicarrier CDMA system that can accommodate two or more different air interfaces.

SUMMARY OF THE INVENTION

The present invention relates to a multicarrier communication system for transmitting data from a transmitting system to a receiving system over multiple carriers. An input data stream is divided into multiple substreams to be assigned to different carriers. An RLP context is established for each carrier to provide a reliable transport mechanism over each carrier. Each substream is transmitted within a corresponding RLP context over an assigned carrier.

The RLP contexts may be negotiated and managed independent of the carriers. When a carrier is dropped, the corresponding RLP context may be persisted for a short period to ensure delivery of data. If any data packets are missing at the receiver, another carrier may be selected to send a NAK to the transmitting system. The missing packets may also be transmitted over the selected carrier. When the missing packets are received, the RLP context for the dropped carrier may be closed.

In some embodiments, different air interfaces may be employed on different carriers. For example, the communication system may comprise a mix of cdma2000 and EVDO carriers. Other access technologies, such as WIMAX, may also be supported.

DETAILED DESCRIPTION

Figure 1:
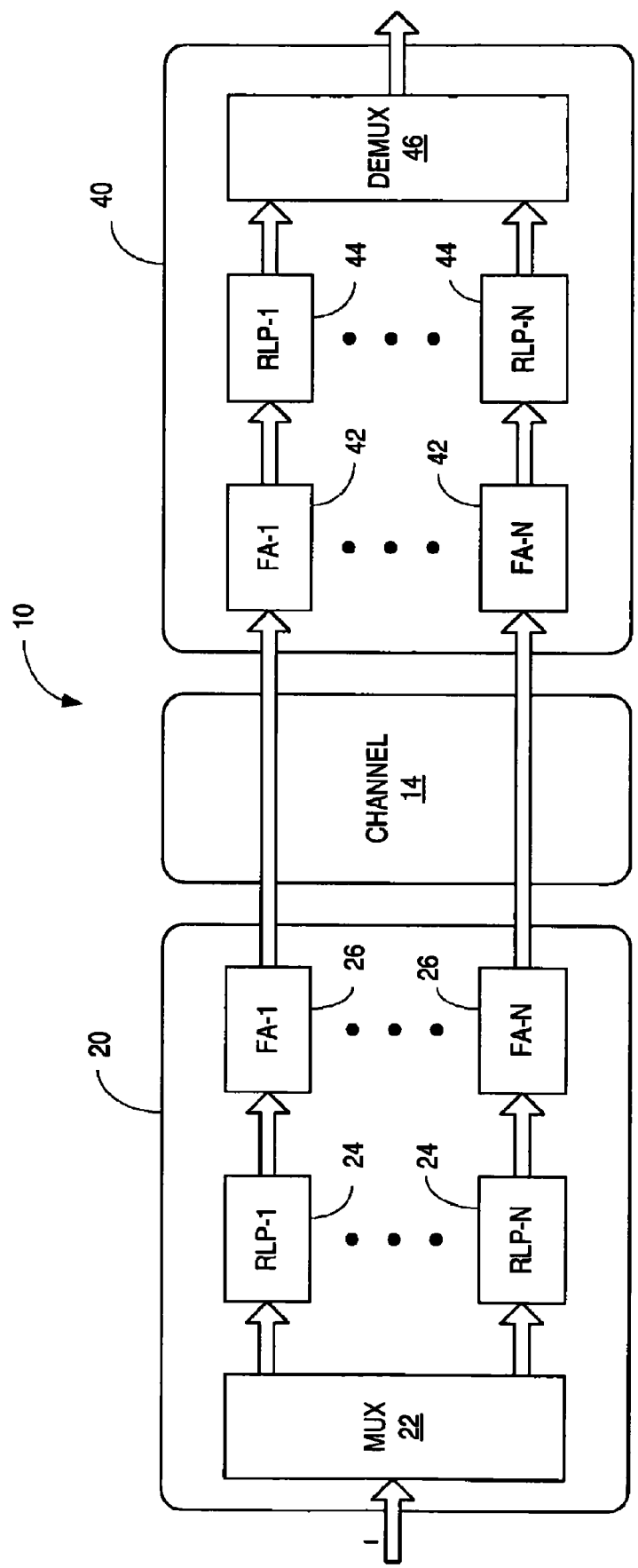
FIG. 1 illustrates an exemplary multicarrier communication system.

Referring now to the drawings, FIG. 1 illustrates a multicarrier communication system 10 according to one embodiment of the invention. An information stream I is input to a transmission system 20 and transmitted over a communication channel 14 to a receiving system 40. A multiplexing circuit 22 in the transmission system 20 divides the information stream I into N substreams for transmission to the receiving system 40 over N carriers. The number of carriers may be determined based on criteria such as channel conditions, data transmission rates, quality of service, etc., and may be dynamically varied during a communication session. Each substream is assigned to a respective one of the N carriers, which may be referred to in the context of the present invention as the frequency assignment (FA) of the substream. There is a 1-to-1 mapping of substreams to carriers. A separate RLP context is established for each substream/carrier, which are managed by one or more RLP controllers 24. Transmit circuits 26 encode, modulate, and transmit each substream over the assigned carrier.

At the receiving system 40, receive circuits 42 receive, demodulate, and decode each substream. One or more RLP controllers 44 manage the RLP context for each carrier and send a negative acknowledgment when RLP packets are missed. A de-multiplexing circuit 46 reassembles the original information stream I from the received substreams.

Figure 2:
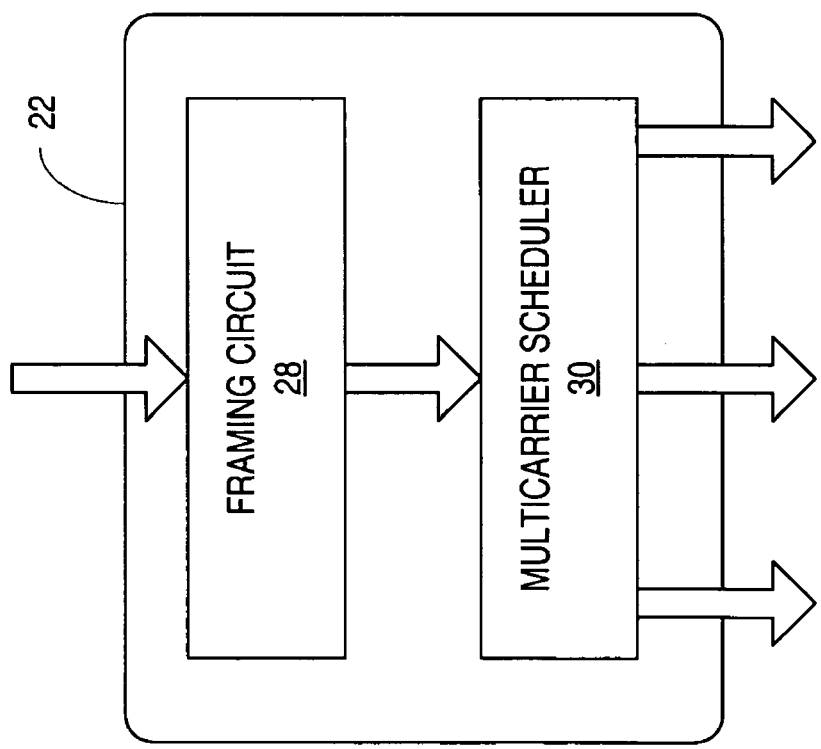
FIG. 2 illustrates an exemplary multiplexing circuit for a transmitting system in a multicarrier communication system.

FIG. 2 illustrates the multiplexing circuit 22 in more detail. The multiplexing circuit 22 includes a framing circuit 28 and a scheduler 30. Framing circuit 28 receives the input information stream, which may comprise an octet stream or packet stream. The framing circuit 28 divides the information stream into frames and adds a header to each frame. The frames are referred to herein as multicarrier frames. The header of each multicarrier frame includes a sequence number that is used by the de-multiplexing circuit 46 to reassemble frames at the receiving system 40. As will be described in more detail below, the multicarrier frames output by the framing circuit 28 may be further segmented. The multicarrier frames, or frame segments, are passed to a scheduler 30.

The scheduler 30 assigns each multicarrier frame or frame segment to one of N carriers. The simplest form of scheduling would be to assign the multicarrier frames in round robin fashion to each of the N carriers. However, this approach would not make the most efficient use of resources. A better approach is to distribute the frames across the N carriers to balance the load based on data transmission rates, data throughput rates, latency, or other performance criterion. For example, the scheduler 30 could distribute the multicarrier frames across the N carriers proportionately based on the effective throughput rate on each carrier. Another approach would be to distribute the frames so as to maintain the packet latency roughly the same across all carriers. Those skilled in the art will appreciate that numerous other scheduling algorithms could be employed and that the present invention is not limited to a particular scheduling algorithm.

Figure 3:
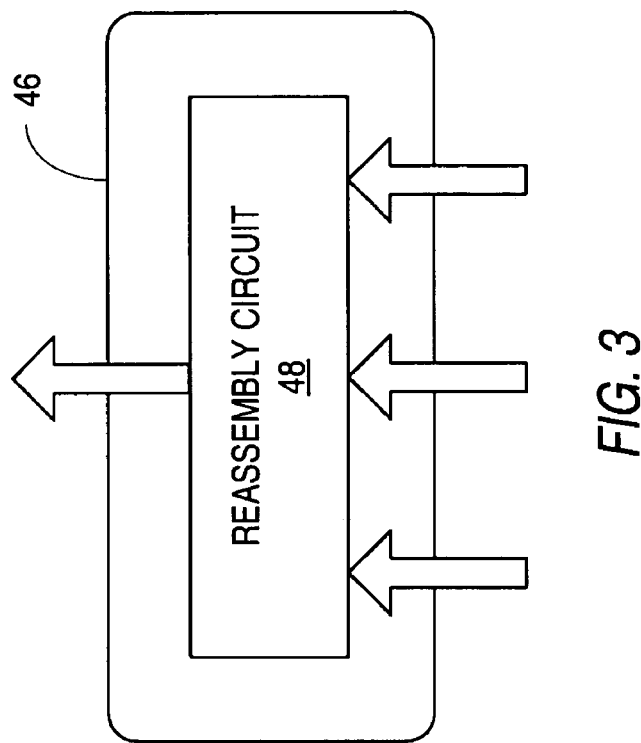
FIG. 3 illustrates an exemplary de-multiplexing circuit for a receiving system in a multicarrier communication system.

FIG. 3 illustrates an exemplary de-multiplexing 46 at the receiving system 40. The de-multiplexing circuit 46 includes a reassembly circuit 48 for reassembling the information stream from the individual substreams. The reassembly circuit 48 removes the header from the multicarrier frames received over each substream and reassembles the original information stream from the received data.

Figure 4:
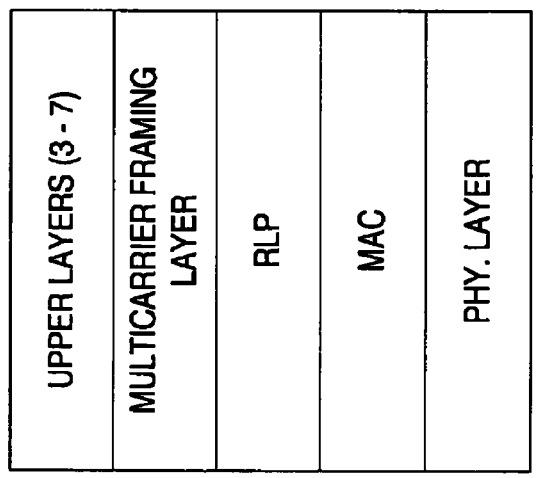
FIG. 4 illustrates an exemplary protocol stack for a multicarrier communication system.

FIG. 4 illustrates an exemplary protocol stack for a multicarrier communication system. The protocol stack generally follows the OSI Reference Model. The protocol layers include the physical layer (layer 1), the link layer (layer 2), and the upper layers (layers 3-7). The physical layer defines the air interface and contains the communication channels by which a base station and mobile station communicate. The physical layer performs coding, modulation, and spreading of signals for transmission, and decoding, demodulation, and despreading of received signals. An advantage of the present invention is that no changes in the physical layer are required because the division of the information stream occurs in higher layers of the protocol stack. The link layer includes the medium access control (MAC) layer, the Radio Link Protocol (RLP) layer, and the multicarrier framing (MCF) layer. The MAC layer provides multiplexing of logical data and signaling channels onto the physical channels and provides quality of service (QoS) management for each active service. The RLP layer, which may be incorporated into the MAC layer, implements a retransmission protocol such as an automatic repeat request (ARQ) protocol to provide reliable transport of user data over the radio link. The MCF layer (MCFL) is a new protocol layer that supports multicarrier transmission of data as hereinafter described. The upper layers (layers 3-7) provide services such as signaling services, voice services, and data services.

Figure 6:
FIG. 6 illustrates an exemplary RLP packet for a multicarrier communication system.
Figure 5:
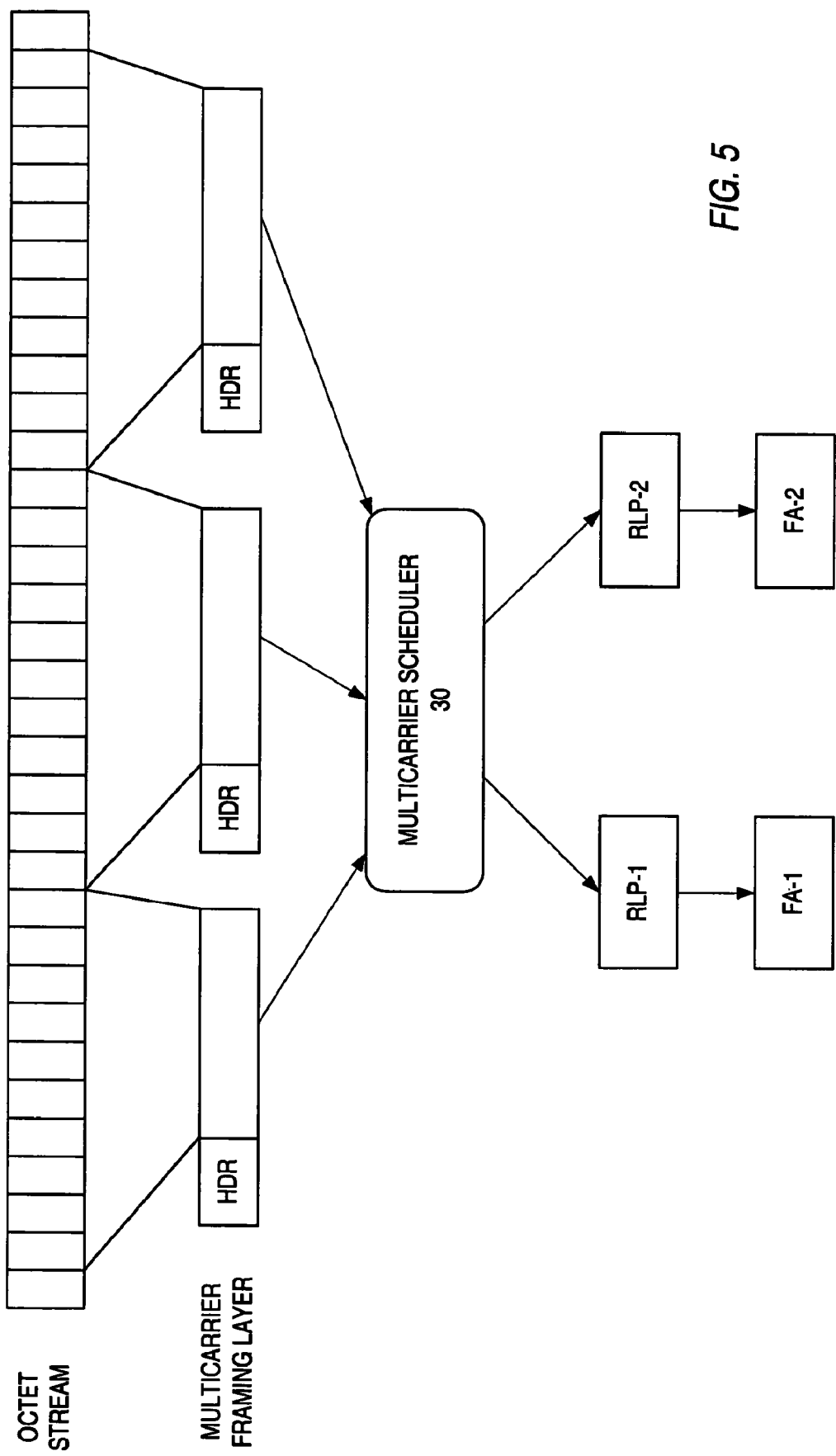
FIG. 5 illustrates the transmission of an octet stream in a multicarrier communication system.

FIG. 5 schematically illustrates an implementation of the MCFL for transmission of an octet stream. In this example, the information stream comprises an octet stream. The octet stream is divided into blocks and a header is added to each block to generate the multicarrier frames. The header comprises a start bit, a 14-bit sequence number, and a stop bit. The start and stop bits are used to delimit the multicarrier frames. The sequence number is used for resequencing the frames at the receiving system 40. A wrapping or circular sequence number space is used. Thus, when the last sequence number is used, numbering restarts at the beginning of the sequence number space. The multicarrier scheduler 30 distributes the multicarrier frames across the available carriers. In the example shown in FIG. 5, two carriers or frequency assignments are shown. An RLP context is established for each carrier or frequency assignment. For each frequency assignment, the RLP controller 24 adds an RLP header to the multicarrier frame as shown in FIG. 6. Thus, each RLP packet includes both an RLP header and multicarrier framing header. In some implementations, multiple RLP packets may be included in a single physical layer frame. In other implementations, a single RLP frame may be divided among multiple physical layer packets.

As is well known in the art, the RLP controller 24 implements a retransmission protocol. When the RLP packets are received out of sequence, the RLP controller 44 at the receiving system 40 sends a negative acknowledgment (NAK) to the RLP controller 24 at the transmission system 20. The NAK'ed RLP packet is then scheduled for retransmission. The retransmitted packet carries the same multicarrier framing header.

Figure 7:
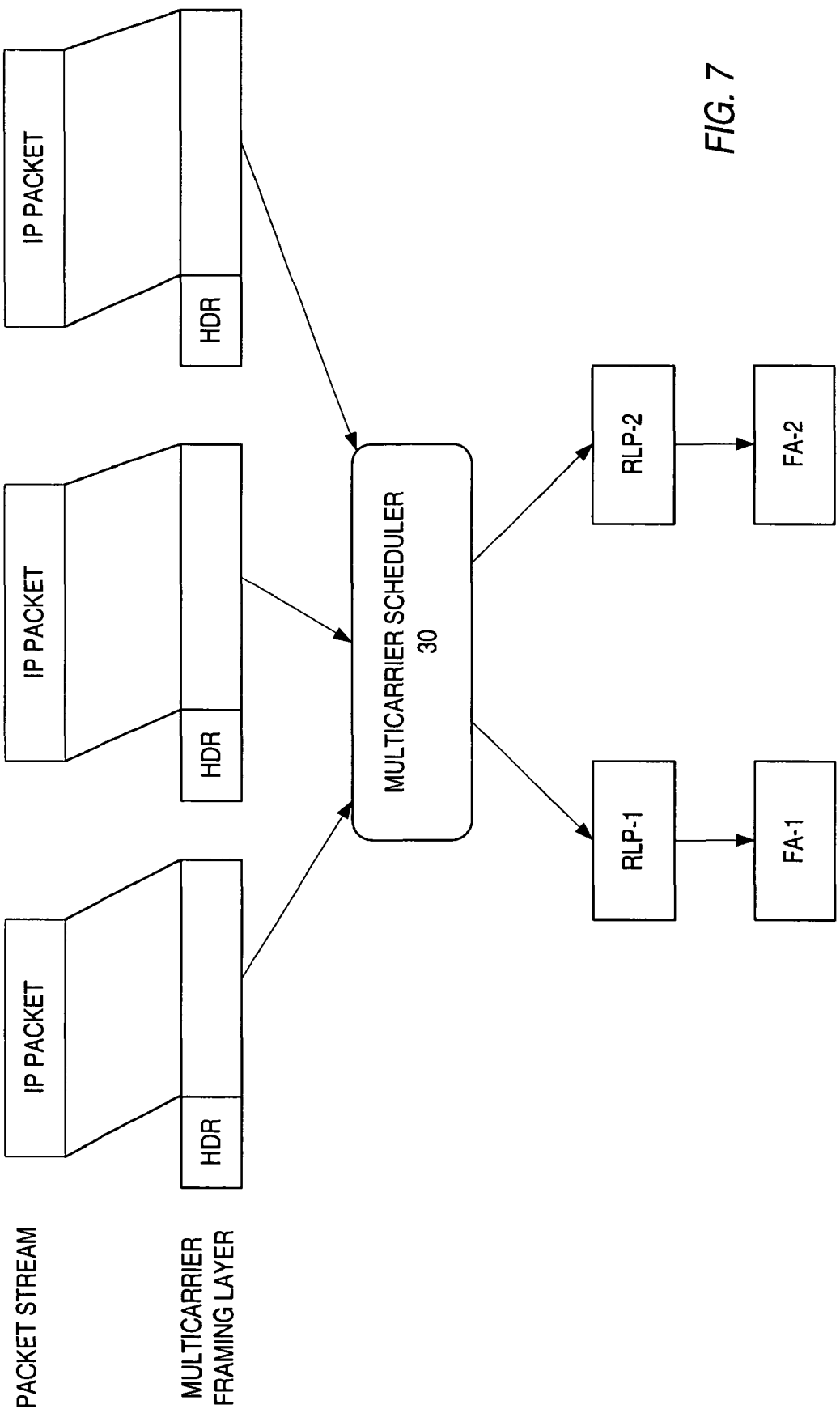
FIG. 7 illustrates the transmission of a packet stream in a multicarrier communication system.

FIG. 7 schematically illustrates an implementation of the MFC layer for transmission of a packet stream. In this example, an Internet protocol (IP) packet stream is being transmitted. Each IP packet is inserted into a multicarrier frame. Each multicarrier frame carries a single IP packet. As in the previous embodiments, the header of the multicarrier frame includes a multicarrier sequence number. The multicarrier scheduler 30 distributes the multicarrier frames 30 across the available carriers. In this example, two carriers or frequency assignments are shown. A separate RLP context is created for each carrier or frequency assignment.

Figure 8:
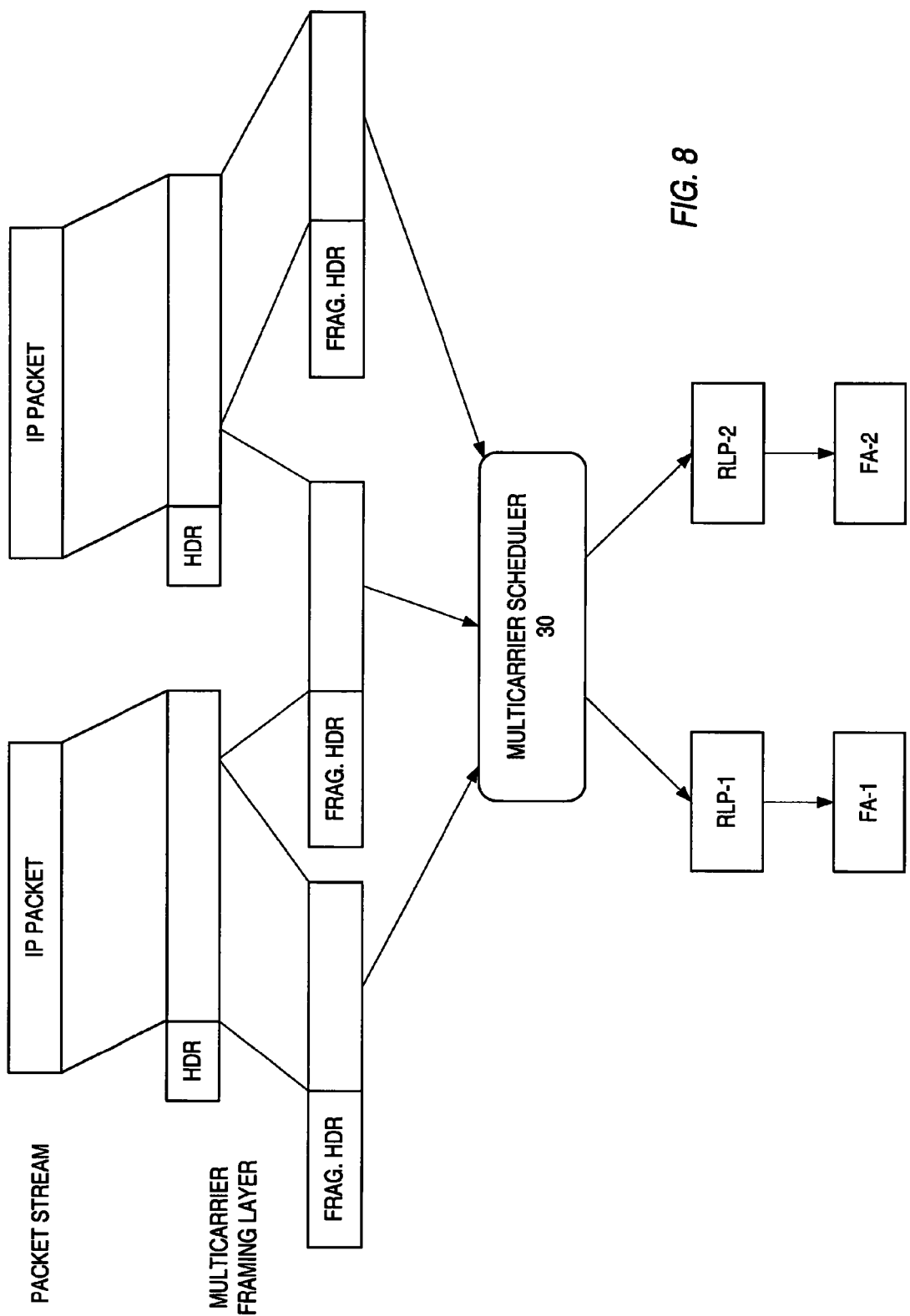
FIG. 8 illustrates the transmission of a packet stream with fragmentation in a multicarrier communication system.

FIG. 8 illustrates an implementation of the MFC layer in which multicarrier frames are fragmented. For delay/jitter-sensitive traffic, additional efficiency can be gained by fragmenting or segmenting a multicarrier frame and sending the frame segments over different carriers or frequency assignments. The fragmentation or segmentation of the multicarrier frames may be performed by the framing circuit 28, and the reassembly of the multicarrier frames may be performed by the reassembly circuit 48. When the multicarrier frames are fragmented, a fragmentation header is added to each frame segment to enable reassembly of the frames at the receiver.

In some embodiments, the frequency assignments may be changed during a communication session. When a frequency assignment is dropped, there may still be missing packets within the corresponding RLP context. In this case, the RLP context is persisted or maintained after the carrier is dropped. The RLP controller 44 at the receiving system 40 may tunnel signaling (e.g., NAKs) to one of the remaining carriers. The RLP controller 24 at the transmitting system 20 may tunnel the retransmitted RLP packets to one of the remaining carriers. Thus, the receiver may send NAKs for packets transmitted over a dropped carrier to one of the remaining frequencies. Similarly, the retransmitted packets are tunneled to an existing carrier for transmission to the receiving system 40.

Figures 9A, 9B:
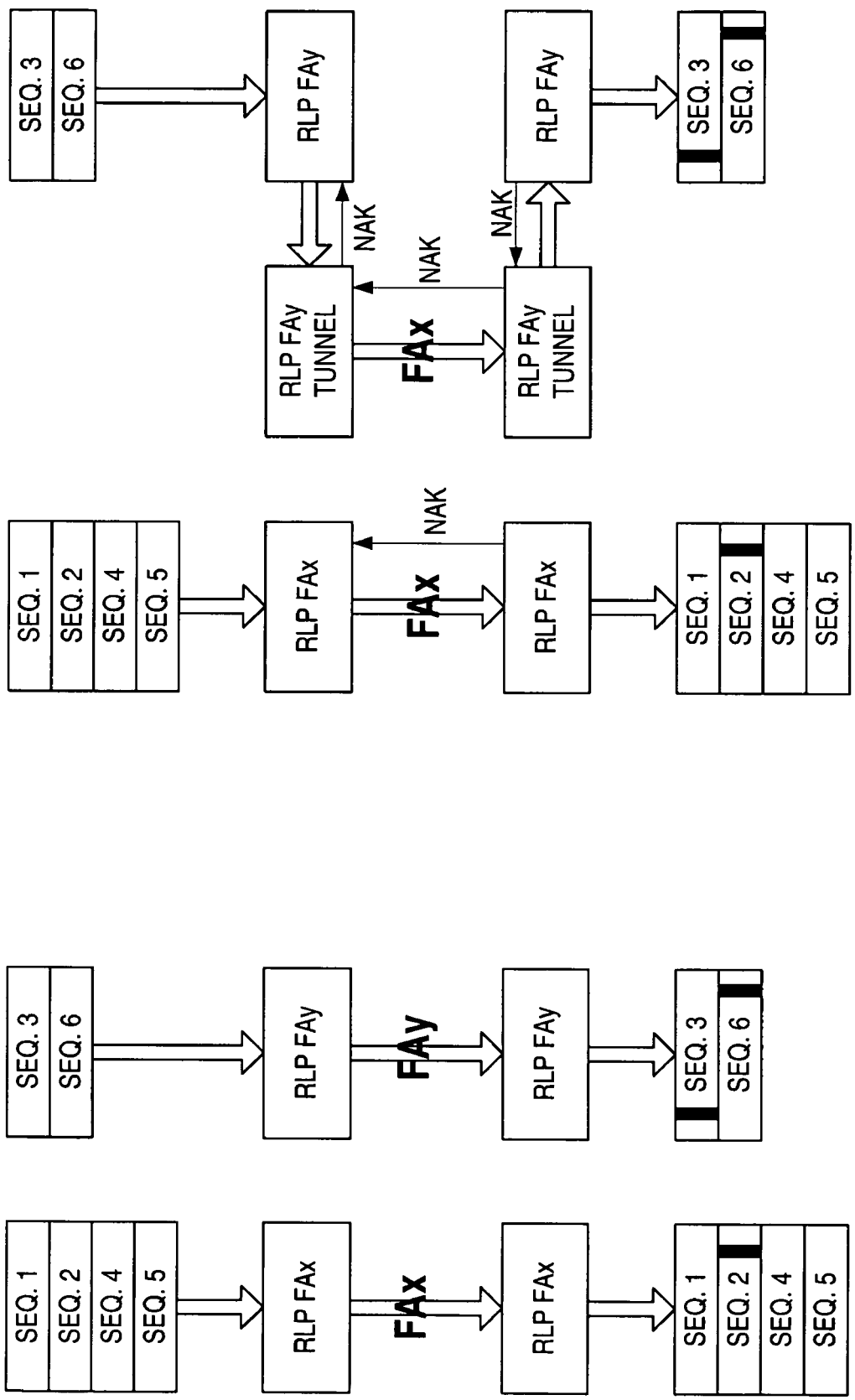
FIGS. 9A & 9B illustrate retransmission of RLP packets in a multicarrier communication system.

FIGS. 9A and 9B illustrate exemplary operations when a carrier is dropped. FIGS. 9A and 9B illustrate transmission of data over two carriers: FAx and FAy. Multicarrier frames 1, 2, 4, and 5 are transmitted over FAx. Multicarrier frames 3 and 6 are transmitted over FAy. Portions of frames 2, 3, and 6 are lost. After the transmission of frames 3 and 6, the carrier associated with FAy is dropped. Referring to FIG. 9B, the receiving system 40 NAKs the missing portion of frame 2 in a conventional manner by sending the NAK over FAx. Because the carrier associated with FAy has been dropped, the NAK for frames 3 and 6 are tunneled to the transmission station over the carrier associated with FAx. Similarly, the retransmitted packets are tunneled to the carrier for FAx and transmitted to the receiving system 40. The RLP context for FAy can thus be maintained after the carrier for FAy is dropped until the missing packets are received at the receiving system 40, or until the receiving system times out and forwards the RLP block with missing packets.

Figure 10:
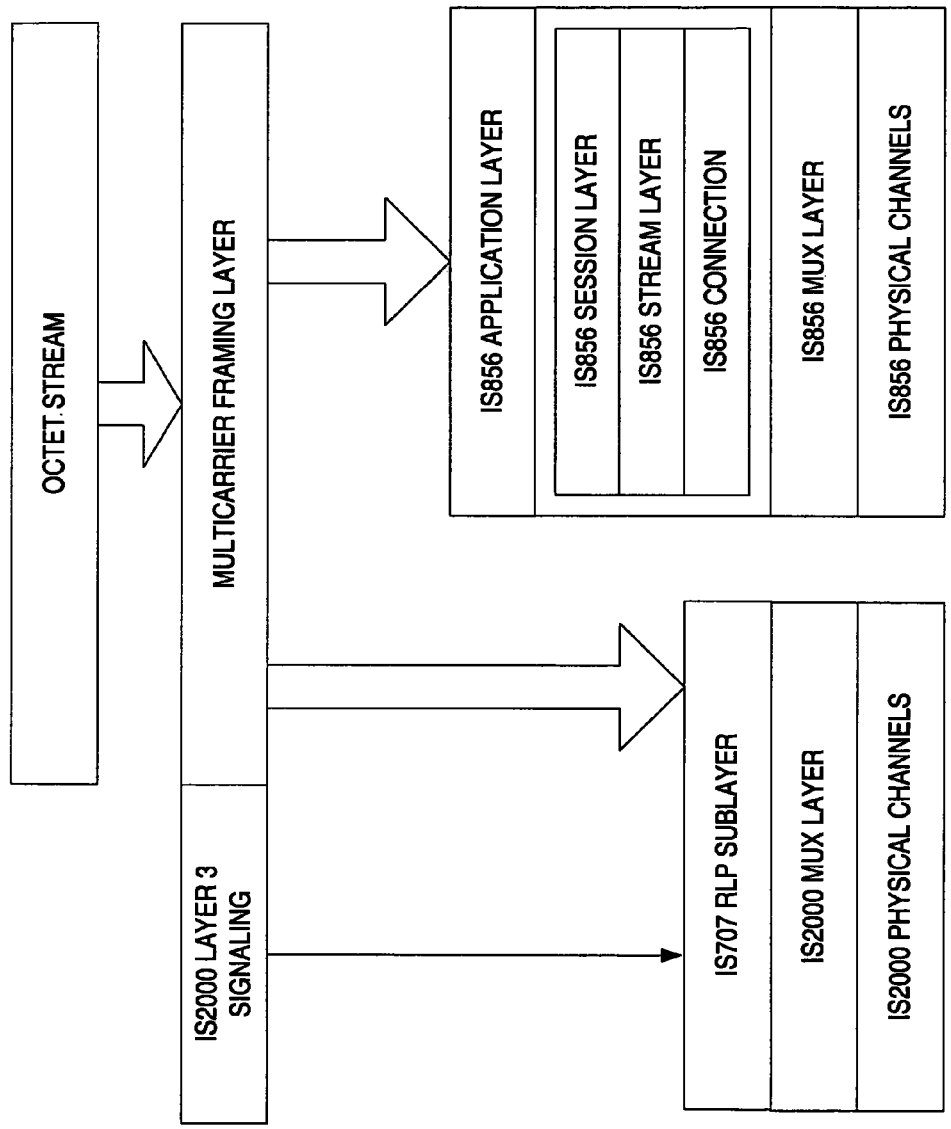
FIG. 10 illustrates a multicarrier communication system with two or more different air interfaces.

FIG. 10 illustrates an implementation in which the multicarrier framing level is configured to operate across multiple carriers with different air interfaces. In this example, carrier FAx supports communications with a mobile station according to TIA-2000 standard. The carrier for FAy supports communications with the mobile station according to TIA-856.

Figure 11:
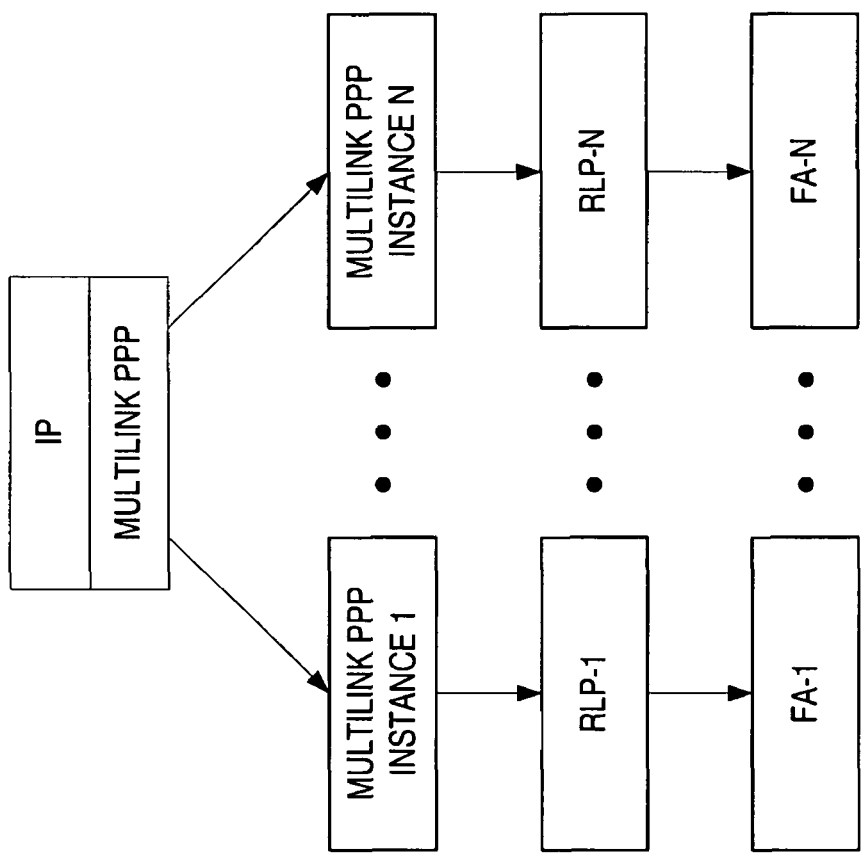
FIG. 11 illustrates a multicarrier communication system with a multilink PPP layer.
Figure 12:
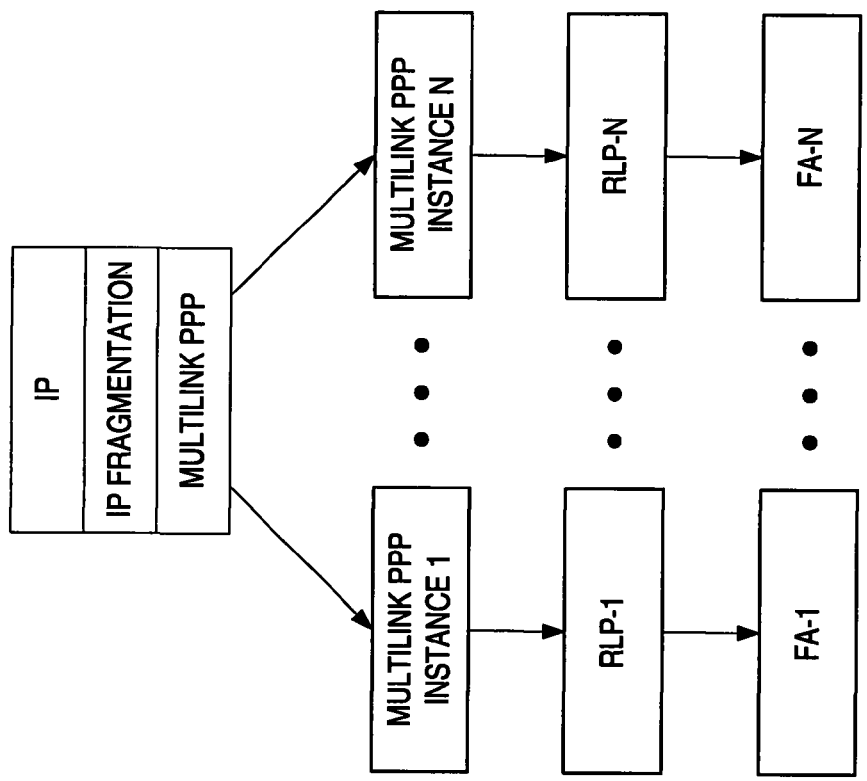
FIG. 12 illustrates a multicarrier communication system with IP fragmentation and multilink PPP layers.

FIGS. 11 and 12 illustrate implementations using the multilink point-to-point (PPP) protocol to divide an IP packet stream into multiple streams. Multilink PPP is based on RFC 1717 published by the Internet Engineering Task Force (IETF). This embodiment has the added complexity in maintaining a PPP link for each carrier, but avoids the additional overhead introduced by the multicarrier framing layer. In this embodiment, the PPP layer manages multiple PPP instances, each of which is associated with a particular carrier. In situations where IP packets are large, a fragmentation layer may be interposed between the IP layer and PPP layer to fragment the IP packets as shown in FIG. 12.

The present invention may, of course, be carried out in other specific ways than those herein set forth without departing from the scope and essential characteristics of the inven-

What is claimed is:

1. A method of transmitting data in a multicarrier CDMA system, said method comprising:
   dividing, in a transmitter, a data stream into two or more substreams assigned to different CDMA carriers;
   creating, in the transmitter, a separate RLP context for each carrier; and
   transmitting each substream within a corresponding RLP context over a designated CDMA carrier.

2. The method of claim 1 wherein dividing a data stream into two or more substreams comprises dividing said data stream into multicarrier frames and assigning each multicarrier frame to a designated CDMA carrier.

3. The method of claim 2 further comprising assigning a multicarrier sequence number to each multicarrier frame for reassembling said data stream at a receiver.

4. The method of claim 3 wherein dividing a data stream into two or more substreams further comprises dividing each multicarrier frame into frame segments, wherein each frame segment of said multicarrier frame has the same multicarrier sequence number.

5. The method of claim 2 further comprising delimiting each multicarrier frame by a start bit and a stop bit.

6. The method of claim 3 wherein assigning each multicarrier frame to a designated CDMA carrier comprises assigning each multicarrier frame to a designated CDMA carrier based on data throughput rates on each CDMA carrier.

7. The method of claim 1 further comprising persisting an RLP context after a corresponding CDMA carrier is dropped and tunneling retransmitted RLP packets for said persistent RLP context to a different CDMA carrier.

8. The method of claim 7 further comprising closing said persistent RLP context after a predetermined time has elapsed since the transmission of a last RLP packet without a NAK.

9. The method of claim 2 wherein dividing a data stream into two or more substreams assigned to different CDMA carriers further comprises establishing a PPP link for each CDMA carrier.

10. A multicarrier communication system for transmitting data, said multicarrier communication device comprising:
    a multiplexer to divide an input data stream into two or more substreams assigned to different CDMA carriers;
    an RLP controller to create a separate RLP context for each COMA carrier; and
    a transmitter to transmit each substream within a corresponding RLP context over a designated CDMA carrier.

11. The multicarrier communication system of claim 10 wherein said multiplexer comprises a framing circuit to divide said data stream into multicarrier frames, and a scheduler to assign said multicarrier frames to designated CDMA carriers.

12. The multicarrier communication system of claim 11 wherein said framing circuit is configured to assign a multicarrier sequence number to each multicarrier frame for reassembling said data stream at a receiver.

13. The multicarrier communication system of claim 12 wherein said framing circuit divides each multicarrier frame into frame segments, wherein each frame segment of said multicarrier frame has the same multicarrier sequence number.

14. The multicarrier communication system of claim 11 wherein said framing circuit delimits each multicarrier frame by a start bit and a stop bit.

15. The multicarrier communication system of claim 12 wherein said scheduler balances the load across multiple CDMA carriers based on data throughput rates on each CDMA carrier.

16. The multicarrier communication system of claim 10 wherein said RLP controller maintains an RLP context after a corresponding CDMA carrier is dropped and tunnels retransmitted RLP packets to a different CDMA carrier.

17. The multicarrier communication system of claim 16 wherein said RLP controller terminates an RLP context after a predetermined time has elapsed since the transmission of a last RLP packet without a NAK.

18. A method of receiving two or more substreams of the same information stream in a multicarrier CDMA system, said method comprising:
    creating, in a receiver, a separate RLP context for two or more CDMA carriers; and
    receiving each substream of said information stream within a corresponding RLP context over a designated CDMA carrier.

19. The method of claim 18 further comprising reassembling said substreams into said information stream.

20. The method of claim 19 wherein each substream comprises a plurality of multicarrier frames, and wherein each multicarrier frame is identified by a corresponding frame sequence number for reassembling said multicarrier frames received over a plurality of CDMA carriers.

21. The method of claim 18 further comprising sending a negative acknowledgement when a missed RLP packet is detected.

22. The method of claim 21 further comprising persisting an RLP context for a dropped CDMA carrier and tunneling said negative acknowledgement to remaining CDMA carrier.

23. The method of claim 22 further comprising receiving retransmitted RLP packets said remaining CDMA carrier.

24. A multicarrier communication system comprising:
    a receiver to receive two or more substreams of an information stream over different CDMA carriers;
    an RLP controller to maintain a separate RLP context for each one of said two or more CDMA carriers; and
    a demultiplexer to reassemble an input data stream from said two or more substreams.

25. The multicarrier communication system of claim 24 wherein each substream comprises a plurality of multicarrier frames, and wherein each multicarrier frame is identified by a corresponding frame sequence number for reassembling said multicarrier frames.

26. The multicarrier communication system of claim 24 wherein said RLP controller sends a negative acknowledgement when a missed RLP packet is detected.

27. The multicarrier communication system of claim 24 wherein said RLP controller maintains an RLP context for a dropped CDMA carrier and tunnels said negative acknowledgement for missed RLP packets to a remaining CDMA carrier.

28. The multicarrier communication system of claim 27 wherein said RLP controller receives retransmitted RLP packets over said remaining CDMA carrier.

* * * * *

UNITED STATES PATENT AND TRADEMARK OFFICE
CERTIFICATE OF CORRECTION

PATENT NO.       : 7,944,992 B2                                        Page 1 of 1
APPLICATION NO.  : 11/453668
DATED            : May 17, 2011
INVENTOR(S)      : Balasubramanian et al.

It is certified that error appears in the above-identified patent and that said Letters Patent is hereby corrected as shown below:

In column 5, Line 46, in Claim 10, delete "COMA" and insert -- CDMA --, therefor.

Signed and Sealed this
Twenty-fourth Day of April, 2012

David J. Kappos
*Director of the United States Patent and Trademark Office*